United States Patent [19]
de Haan et al.

[11] Patent Number: 5,495,300
[45] Date of Patent: Feb. 27, 1996

[54] MOTION-COMPENSATED PICTURE SIGNAL INTERPOLATION

[75] Inventors: Gerard de Haan; Olukayode A. Ojo; Paul W. A. C. Biezen; Hendrik Huijgen, all of Eindhoven, Netherlands

[73] Assignee: U.S. Philips Corporation, New York, N.Y.

[21] Appl. No.: 231,858

[22] Filed: Apr. 22, 1994

Related U.S. Application Data

[63] Continuation of Ser. No. 73,403, Jun. 7, 1993.

[30] Foreign Application Priority Data

Jun. 11, 1992 [EP] European Pat. Off. ............. 92201708

[51] Int. Cl.⁶ ..................................... H04N 7/01
[52] U.S. Cl. .................. 348/699; 348/459; 348/447; 348/452
[58] Field of Search ...................... 348/448, 459, 348/910, 699, 452, 447, 443; H04N 7/01

[56] References Cited

U.S. PATENT DOCUMENTS

| | | | |
|---|---|---|---|
| 4,730,217 | 3/1988 | Tonge et al. | 358/140 X |
| 4,731,651 | 3/1988 | Matsumoto et al. | |
| 5,027,206 | 6/1991 | Vreeswijk et al. | 358/105 X |
| 5,055,925 | 10/1991 | Lamabhi | 358/140 X |
| 5,072,293 | 12/1991 | De Haan et al. | |
| 5,177,610 | 1/1993 | Wilkinson | 358/105 X |

OTHER PUBLICATIONS

G. Holoch, "Aspekte der Normwandlung von HDTV in bestehende Fernsehstandards", Fernseh– und Kino–Technik, vol. 42, No. 4/ 1988, pp. 177–184.

G. Kummerfeldt et al., "Coding Television signals at 320 and 64 kbit/s", Proceedings of the second international technical symposium on optical and electro–optical applied science and engineering, SPIE vol. 594, (1985), pp. 119–128.

Primary Examiner—Victor R. Kostak
Attorney, Agent, or Firm—Michael E. Marion

[57] ABSTRACT

In a motion-compensated picture signal interpolation apparatus comprising a field memory (FM2) for delaying an input field sequence, a motion vector estimator (ME) for furnishing motion vectors, and a motion-compensated interpolator (MC) coupled to an input and an output of the field memory (FM2) for furnishing a sequence of motion-compensated output fields on the basis of the motion vectors, inputs of the motion vector estimator (ME) are coupled to the input and the output of the field memory (FM2) to estimate the motion vectors by means of the same single field memory (FM2) which is used for the motion-compensated interpolation. (FIG. 1)

12 Claims, 2 Drawing Sheets

| 1: | A | | B | | C | | D | | E | | F |
|---|---|---|---|---|---|---|---|---|---|---|---|
| 2: | Z | A | A | B | B | C | C | D | D | E | E |
| 3: | Y | Z | Z | A | A | B | B | C | C | D | D |
| 4: | YZ | Z | ZA | A | AB | B | BC | C | CD | D | DE |

| 1: | A | | A' | | B | | B' | | C | | C' |
|---|---|---|---|---|---|---|---|---|---|---|---|
| 2: | Z' | A | A | A' | A' | B | B | B' | B' | C | C |
| 3: | Z | Z' | Z' | A | A | A' | A' | B | B | B' | B' |
| 4: | Z' | ZA | ZA' | A | A' | AB | AB' | B | B' | BC | BC' |

| 2: | A | B | C | D | E | F |
|---|---|---|---|---|---|---|
| 3: | Z | A | B | C | D | E |
| 4: | ZA | AB | BC | CD | DE | EF |

| 2: | A | A' | B | B' | C | C' |
| 3: | Z' | A | A' | B | B' | C |
| 4: | ZA' | A | AB' | B | BC' | C |

| 2: | A | A' | B | B' | C | C' |
| 3: | Z' | Z' | A' | A' | B' | B' |
| 4: | Z' | ZA | A' | AB | B' | BC |

MOTION-COMPENSATED PICTURE SIGNAL INTERPOLATION

This is a continuation of application Ser. No. 08/073,403, filed Jun. 7, 1993.

BACKGROUND OF THE INVENTION

The invention relates to an apparatus for motion-compensated picture signal interpolation, such as a field rate doubling apparatus for obtaining a flicker-free display of picture signals, or an interlace-to-progressive scan converter. The invention further relates to a receiver for television signals including such an apparatus.

Motion-compensated picture signal interpolation is known in the art. Although experiments have shown that images obtained by motion-compensated picture signal interpolation techniques can be better than those obtained by other picture signal interpolation techniques, motion-compensated picture signal interpolation is not yet widely used because of the complexity of the hardware for the motion vector estimation which is necessary to furnish motion vectors, and for the motion-compensated interpolation itself. More specifically, current implementations of motion vector estimation and compensation apparatuses require several expensive field memories. For example, U.S. Pat. No. 4,731,651 describes a field number converter in which a first field memory is used for motion vector estimation, while second and third field memories are used for motion-compensated interpolation by means of the estimated vectors.

The article "Aspekte der Normwandlung von HDTV in bestehende Fernsehstandards" in the periodical Fernseh- und Kino-Technik, Vol. 42, No. 4/1988, pp. 177–184, describes an apparatus for converting a picture signal having 60 interlaced fields per second into a picture signal having 50 interlaced fields per second. In this article, it is proposed to estimate motion vectors on the basis of input and output signals of an image memory, i.e. a two-field memory, and to perform a motion-compensated position interpolation on the basis of the input and output signals of the same two-field memory by means of the estimated motion vectors. However, the article states that this motion-compensated position interpolation is to be realized later when optimal and feasible motion detection and motion-compensation methods have been developed.

SUMMARY OF THE INVENTION

It is, inter alia, an object of the invention to provide a less expensive motion-compensated picture signal interpolation apparatus. To this end, a primary aspect of the invention provides a motion-compensated picture signal interpolation apparatus as defined in claim 1.

In a field rate doubling apparatus, the invention is based on the recognition that if the motion vector estimator operated on a field sequence having an increased number of fields, thereby requiring a correspondingly increased operation speed and/or higher processing hardware costs, a single field memory would suffice for both motion vector estimation and motion-compensated interpolation, so that one field memory can be dispensed with. Normally speaking, the complexity of motion vector estimation hardware will dissuade those skilled in the art from doubling the motion estimation operation speed and/or processing hardware costs. However, when this disadvantage is accepted, it appears that one field memory can be dispensed with. As field memories are one of the most expensive parts of a motion-compensated picture signal interpolation apparatus, an overall saving in hardware is achieved. As will be set out in more detail hereinafter, the common use of a single field memory for both motion vector estimation and motion-compensated interpolation is very advantageous also in other applications like progressive scan conversion, movie film motion portrayal improvement, etc.

In an attractive embodiment of the invention, several line memory sections can be dispensed with in that the interpolation apparatus further comprises a motion vector memory for storing the estimated motion vectors, while the motion-compensated interpolator furnishes the sequence of motion-compensated output fields on the basis of the motion vectors stored in this motion vector memory. This yields a sufficiently large delay between the estimation of a motion vector for a given block and the instant when this motion vector is needed for carrying out a motion-compensated interpolation, so that the same line-memory sections can be used for both motion vector estimation and motion-compensated interpolation. This embodiment is defined in claim 2. The embodiment is especially simple when a motion vector estimator is used which employs motion vectors estimated during a previous field period, like the one described in European Patent Application EP-A-0,415,491 (PHN 13,068), because then no additional motion vector memory is required.

A very advantageous aspect of the invention iS adapted to improve the motion portrayal of a sequence of television fields originating from film. As these television fields are obtained by scanning each film picture twice so as to obtain two television fields, 50 of such television fields still represent only 25 movement phases per second. By means of motion vector estimation and motion-compensated interpolation in accordance with the present invention, the number of film movement phases per second can be doubled in a very attractive manner. In one embodiment, the number of television fields per second is maintained, while in another embodiment the number of television fields per second is doubled; in both embodiments, the output fields represent a number of movement phases per second which is doubled with respect to the number of movement phases per second represented by the input fields. This aspect of the invention is defined in claims 3, 5, 7 and 9.

A simple manner of providing a sequence of non-interlaced output pictures is defined in claim 8, in which motion vectors estimated between a first and a second field are used to interpolate lines from a third field between lines from the second field to obtain a progressively scanned output field.

Claim 10 defines a receiver for television signals in which the motion-compensated picture signal interpolation apparatus of claim 1 or 9 is used to enhance received and decoded television signals.

These and other aspects of the invention will be apparent from and elucidated with reference to the embodiments described hereinafter.

DETAILED DESCRIPTION OF THE PREFERRED EMBODIMENTS OF THE INVENTION

Figures 1, 2, 3, 4:
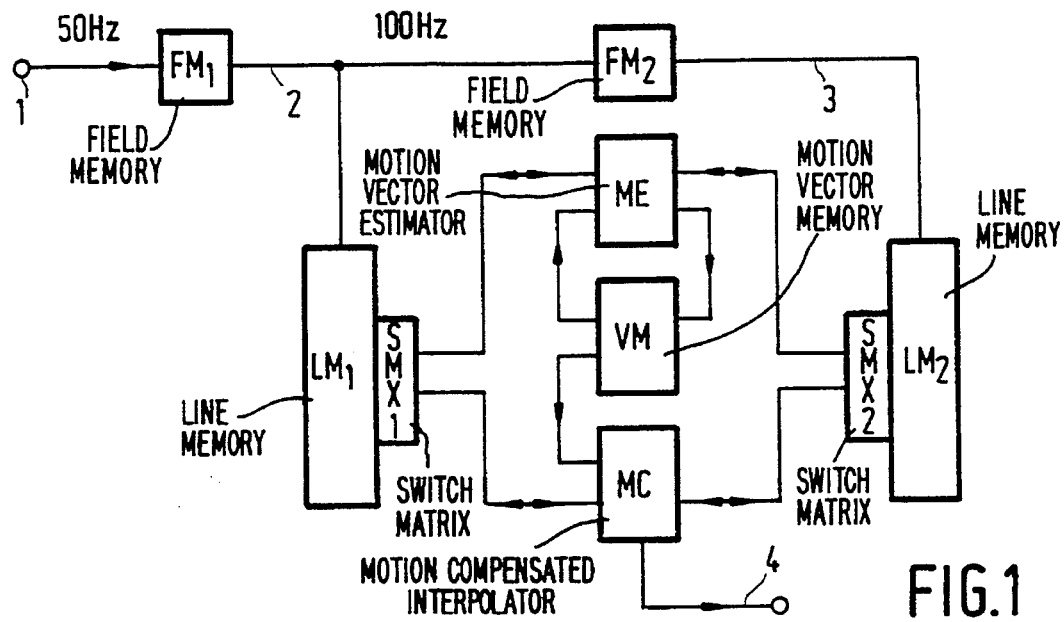
FIG. 1 shows a block diagram of an embodiment of a field number converter in accordance with the invention.
FIG. 2 shows a time diagram of successive fields at several locations in the embodiment of FIG. 1.
FIG. 3 shows a time diagram of successive fields at several locations in the embodiment of FIG. 1 when film fields are processed.
FIG. 4 shows a time diagram of successive fields at several locations in an embodiment of an interlaced-toprogressive scan converter which maintains the field frequency.

In the field number converter embodiment shown in FIG. 1, a first field memory FM1 receives a picture signal whose field rate is 50 Hz. In FIG. 2, line 1 shows a time diagram of the incoming field sequence A, B, C, D, E, F of the picture signal. By means of the field memory FM1, the field rate; of the picture signal is doubled by reading each field of the picture signal twice from the first field memory FM1. In FIG. 2, line 2 shows a time diagram of the field sequence supplied by the field memory FM1. This sequence is applied to a second field memory FM2, which writes each second occurrence of each field applied to it, while the second field memory FM2 ignores the first time when a field is applied to it. Each field which has been written into the second field memory FM2 is read twice from the second field memory FM2. In FIG. 2, line 3 shows a time diagram of the field sequence supplied by the second field memory FM2.

The embodiment of FIG. 1 further comprises a single set of two line memory sections LM1, LM2, each comprising a tapped delay line of, for example, 5 line memories and 16 pixel memories per line memory tap, so that each pixel in a given area can be reached.

FIG. 1 further shows a motion vector estimator ME which communicates with the line memory sections LM1, LM2 through switch matrices SMX1, SMX2, i.e. the motion vector estimator ME furnishes candidate motion vectors to the line memory sections LM1, LM2, and the line memory sections LM1, LM2 furnish corresponding pixel values to the motion vector estimator ME. As disclosed in EP-A-0,415,491 (PHN 13,068), the motion vector estimator ME preferably uses also vectors determined for a previous field which are supplied by a motion vector memory VM. In accordance with the present embodiment of the invention, these previous field vectors are also applied to a motion-compensated interpolator MC which, like the motion vector estimator ME, communicates with the line memory sections LM1, LM2 through the switch matrices SMX1, SMX2. In FIG. 2, line 4 shows a time diagram of the output field sequence of the motion-compensated field rate doubling apparatus of FIG. 1, in which AB indicates an interpolated field based on input fields A and B, etc.

It is a feature of the present aspect of the invention that the input to the motion vector estimator ME is constituted by fields at a 100 Hz field rate rather than at the usual 50 Hz field rate. The use of 100 Hz input fields requires a doubling of the operation speed and/or the hardware. Now that both the motion vector estimator ME and the motion-compensated interpolator MC operate on 100 Hz fields, one and the same single field memory FM2 can be used for the motion vector estimation and the motion-compensated interpolation. This common use of a single field memory implies a significant economy of hardware in comparison with prior art architectures.

The circuit of FIG. 1 operates as follows. The first time when two 100 Hz input fields are available, for example fields Z (FIG. 2, line 3) and A (FIG. 2, line 2) when line 4 indicates that field Z is output, motion vectors are estimated between fields Z and A. These vectors are stored in the motion vector memory VM and used to create output field ZA the next time when fields Z and A are available. During the creation of the output field ZA, the motion vector estimator ME may again estimate the vectors between the fields Z and A to improve the quality of the vectors stored in the motion vector memory VM, which vectors are used as previous field vectors when motion vectors are estimated between fields A (FIG. 2, line 3) and B (FIG. 2, line 2) during the field period in which line 4 indicates that field A is output. The use of the output vectors of the motion vector memory VM for the motion-compensated interpolation made it possible to have only a single set of line memory sections LM1, LM2, because the motion vector memory VM provides for the required delay between the instant when the motion vector for a given block is estimated and the instant when this motion vector is needed for the motion-compensated interpolation. As will be described below with reference to FIG. 6, it is alternatively possible to carry out the motion-compensated interpolation with motion vectors taken directly from the motion vector estimator ME, but then an expensive additional set of line memory sections is required to provide for the required delay. As the motion vector estimator disclosed in EP-A-0,415,491 (PHN 13,068) incorporates a motion vector memory VM anyway, the output of this motion vector memory VM is used to great advantage to allow for a common use of the single set of line memory sections LM1, LM2 both for motion vector estimation and motion-compensated interpolation.

During the field periods in which no motion-compensated interpolation takes place, the output field is obtained from the output of the second field memory FM2 through the line memory section LM2 and the motion-compensated interpolator MC. Alternatively, the output field may be taken directly from the second field memory during these field periods by means of a switch (not shown) selecting between the output of the motion-compensated interpolator and the output of the second field memory FM2.

FIG. 3 shows a time diagram of successive fields at several locations in the field number converter embodiment of FIG. 1 when film fields are processed. In FIG. 3, input fields A and A' originate from the same film picture, etc. While lines 1 through 3 of FIG. 3 correspond to lines 1 through 3 of FIG. 2, line 4 is different. In line 4 of FIG. 3, pairs of input fields (for example, A and A') are alternated with pairs of interpolated fields (for example, AB and AB'). Interpolated field AB is created by means of motion vectors estimated between fields Z' and A. These motion vectors are still available because the contents of the motion vector memory VM are not changed when two fields (for example, A and A') originating from the same film picture are present at the output and the input of the second field memory FM2. Interpolated field AB' is created by means of motion vectors estimated between fields A' and B during the first time when fields A' and B were available at the output and the input of the second field memory FM2.

When this film field number converter is analyzed in greater detail, two aspects can be recognized. The first aspect is the common use of the single field memory FM2 for both motion vector estimation and motion-compensated interpolation, the advantages of which have been set out above. The second aspect is that the motion portrayal of the film field sequence is improved by increasing the number of movement phases per second from 25 Hz to 50 Hz by means of motion-compensated interpolation. In the input film field sequence, the 50 incoming fields per second represent only 25 movement phases per second because, as is common practice, such a sequence is obtained by scanning each 25 Hz film picture (picked up at 24 Hz) twice to obtain even and odd interlaced 50 Hz television fields. Each time, a pair of two successive fields relates to the same movement phase. In the output field sequence, the 100 Hz fields per second represent only 50 movement phases per second because in the sequence A A' AB AB', fields A, A' and AB, AB' constitute only two movement phases. Accordingly, this aspect of the invention provides a 50 movement phases per second motion-compensated field sequence, in which each field is "repeated" to obtain a 100 Hz field sequence, whereby pairs of input fields are alternated with pairs of interpolated fields. This aspect is based on the recognition that, with the risk of motion-compensation artifacts in mind, it is safer to create only one additional movement phase per available movement phase by means of motion-compensated interpolation followed by a simple field-repetition, than to create three additional movement phases per available movement phase by means of motion-compensated interpolation when it is desired to have a 100 Hz output field rate. As far as the latter aspect is concerned, the positioning and connections of the motion vector estimator ME are of minor importance.

A further aspect of the invention provides an interlaced-to-progressive scan converter which maintains the field frequency. An embodiment of this converter is identical to the embodiment shown in FIG. 1, however, without the first field memory FM1. A corresponding time diagram is shown in FIG. 4 to explain the operation of this embodiment. Output signal line 4 of FIG. 4 shows that each non-interlaced output field is obtained by motion-compensated interpolation, for example, by means of inserting motion-compensated lines from interlaced input field B between the lines of interlaced input field A. The motion vectors required for this motion-compensated insertion to produce output field AB are furnished by the vector memory which contains vectors estimated when input fields Z and A were present at the output and the input of the field memory FM2. Again, the advantage is achieved that only a single field memory FM2 and a single set of line memory sections LM1, LM2 are required for both motion vector estimation and motion-compensated interpolation. Although one could say that vectors of the "wrong" time interval are used, this causes no serious problems when the vector field is sufficiently consistent in the course of time; the motion vector estimator described by EP-A-0,415,491 (PHN 13,068), herein incorporated by reference, provides a vector field which is sufficiently consistent. It should be noted that the article "Coding television signals at 320 and 64 kbit/s" by G. Kummerfeldt et al., Proceedings of the second international technical symposium on optical and electrooptical applied science and engineering, Cannes 1985, SPIE Vol. 594 Image Coding (1985) pp. 119–128, already proposes to use motion parameters estimated between first and second fields for extrapolating first additional fields between the second and a third field, while second additional fields between the second and third fields are created on the basis of motion parameters estimated between these second and third fields. However, since in this article, motion parameters are estimated in an encoder and used in a decoder, the article includes no suggestion that motion vector estimation and motion-compensated interpolation can be carded out by means of the same line memory sections if motion vectors estimated during the "wrong" time interval are used.

Figures 5, 6, 7:
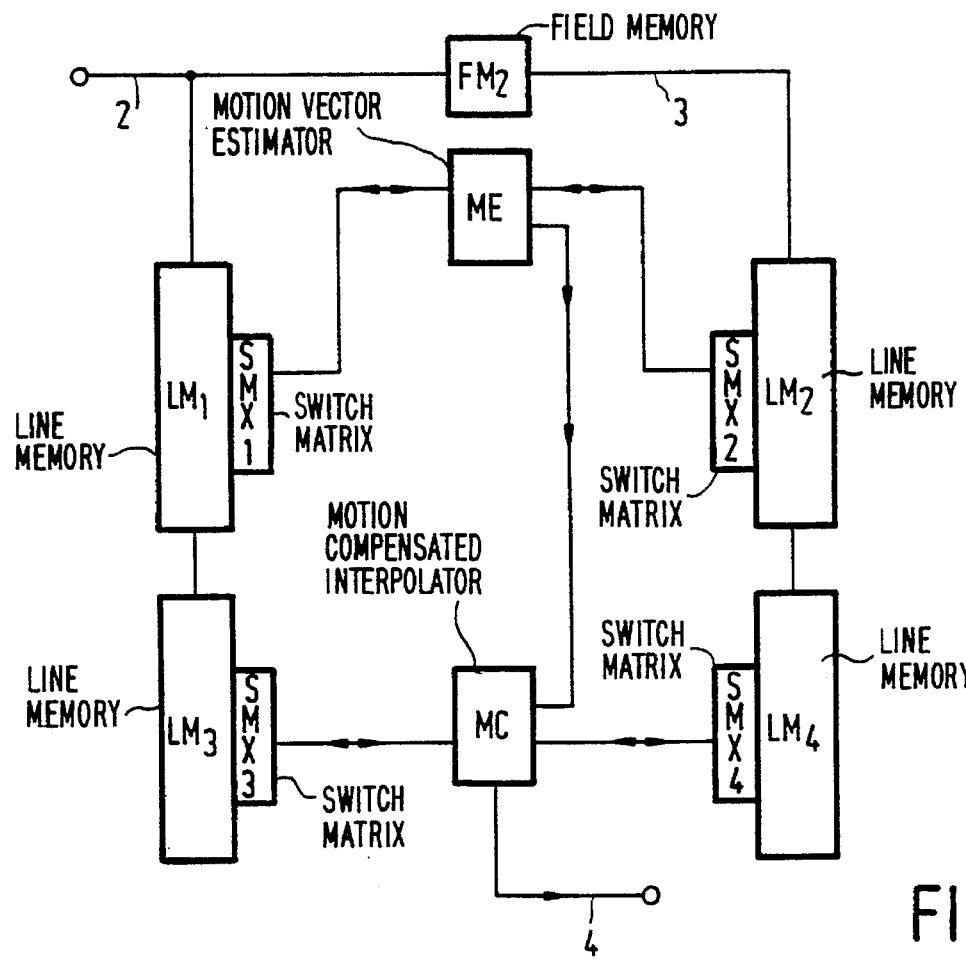
FIG. 5 shows a time diagram of successive fields at several locations in a first embodiment of a film motion portrayal improvement converter.
FIG. 6 illustrates a second embodiment of a film motion portrayal improvement converter.
FIG. 7 shows a time diagram of successive fields at several locations in the embodiment of FIG. 6.

Yet another aspect of the invention provides a converter for improving the motion portrayal of picture signals originating from movie film to obtain, for example, 50 movement phases per second instead of the usual 25 movement phases per second corresponding to a sequence of pairs of 50 Hz fields, whereby both fields of each pair belong to the same movement phase, i.e. the same film picture. A first embodiment of this converter is identical to the embodiment shown in FIG. 1, again without the first field memory FM1. A corresponding time diagram is shown in FIG. 5 to explain the operation of this embodiment. A comparison of lines 2 and 3 of FIG. 5 shows that this time the field memory FM2 is simply used as a field delay. When two fields from the same movement phase are present at the terminals of the field memory FM2, one of them is output. When two fields from different movement phases are present at the terminals of the field memory FM2, a motion-compensated interpolation is performed. In a similar manner as in the previous embodiment illustrated by means of the time diagram of FIG. 4, vectors estimated between fields Z' and A are used to interpolate between fields A' and B.

FIG. 6 illustrates a second embodiment of the film motion portrayal improvement converter. In FIG. 6, motion vector estimator ME uses the line memory sections LM1 and LM2, while the motion-compensated interpolator MC uses line memory sections LM3 and LM4, with which it communicates through switch matrices SMX3 and SMX4. In comparison with the previous embodiment of the film motion portrayal improvement converter, this embodiment has the advantage that the motion-compensated interpolation between fields A' and B uses motion vectors estimated between these same fields rather than between fields Z' and A. This advantage is obtained at the expense of two extra line memory sections LM3, LM4 and corresponding switch matrices SMX3, SMX4, which are required to cause a sufficiently large delay between the estimation of the motion vectors and the use of the estimated vectors for motion-compensated interpolation. The embodiment of FIG. 6 may operate as illustrated in the time diagram of FIG. 5 or as illustrated in that of FIG. 7. In the latter situation, the field memory FM2 is controlled in the same way as in FIG. 1, so that it twice outputs each second field received by it. Again, the advantage is obtained that motion-compensated interpolation to create output field AB is performed by means of motion vectors which are estimated between fields A', B' of the same movement phases as those between which the interpolation takes place. Although additional line memory sections LM3, LM4 are used, still only a single field memory FM2 is required for both motion vector estimation and motion-compensated interpolation. In the embodiment of FIG. 6, no motion vector memory is shown, because the additional line memory sections LM3, LM4 already create the required delay between motion vector estimation and motion-compensated interpolation. However, if desired, the motion estimator ME may still include such a motion vector memory.

With the time diagram of FIG. 7, it is also possible to use the embodiment shown in FIG. 1 again, without the first field memory FM1. In that situation, motion vectors estimated when fields A' and B are present at the output and the input of the field memory FM2 are used to create output field AB when fields A' and B' are present at the output and the input of the field memory FM2.

Still another embodiment of the film motion portrayal improvement converter is especially adapted for 60 Hz countries. In such countries, every two successive 24 Hz film pictures F1 F2 are commonly converted into 60 Hz television fields by scanning each first film picture F1 two times and each second film picture F2 three times, so that a sequence like F1 F1 F2 F2 F2 etc. results. In accordance with the present embodiment, the motion portrayal of this sequence is improved by replacing the first occurrence of the field F2 by a motion-compensated field Free, so that the sequence F1 F1 Free F2 F2 results. This embodiment can easily be realized with the block diagram shown in FIG. 6 or with that shown in FIG. 1 without the first field memory FM1.

It should be noted that the above-mentioned embodiments illustrate rather than limit the invention, and that those skilled in the art will be able to design many alternative embodiments, all falling within the scope of the, following claims.

We claim:

1. A motion-compensated picture signal interpolation apparatus comprising:
   (a) a single field memory having a capacity to store only a single field, for delaying a picture signal field sequence;
   (b) motion vector estimation means for furnishing interfield motion vectors; and
   (c) motion compensation interpolation means for furnishing a sequence of motion compensated output fields on the basis of said motion vectors;
   wherein said motion vector estimation means and motion compensated interpolation means switchably share said single field memory.

2. A motion-compensated picture signal interpolation apparatus as claimed in claim 1, further comprising a motion vector memory for storing said motion vectors, said motion-compensated interpolation means furnishing said sequence of motion-compensated output fields on the basis of motion vectors stored in said motion vector memory.

3. A motion-compensated picture signal interpolation apparatus as claimed in claim 2, wherein in the presence of fields originating from film pictures, the contents of said motion vector memory are not changed when two fields originating from a same film picture are present at said input and said output of said single field memory, motion vectors estimated between a first and a second film picture being used to interpolate a field between said second and a third film picture.

4. A motion-compensated picture signal interpolation apparatus as claimed in claim 1, further comprising an input field memory for applying said picture signal field sequence at a doubled field rate to said single field memory, to said motion vector estimation means, and to said motion-compensated interpolation means.

5. A motion-compensated picture signal interpolation apparatus as claimed in claim 4, further comprising a motion vector memory for storing said motion vectors, said motion-compensated interpolation means furnishing said sequence of motion-compensated output fields on the basis of motion vectors stored in said vector memory, wherein in the presence of fields originating from film pictures, the contents of said motion vector memory are not changed when two fields originating from a same film picture are present at said input and said output of said single field memory, and said apparatus furnishes an output field sequence constituted by pairs of input fields alternated with pairs of interpolated fields.

6. A motion-compensated picture signal interpolation apparatus as claimed in claim 1, comprising a first set of line memory sections for coupling said input and said output of said single field memory to said motion vector estimation means, and a second set of line memory sections coupled between said first set of line memory sections and said motion-compensated interpolation means.

7. A motion-compensated picture signal interpolation apparatus as claimed in claim 1, wherein in the presence of fields originating from film pictures, motion vectors estimated between a first and a second film picture are used to interpolate a field (AB) between said first and second film pictures.

8. A motion-compensated picture signal interpolation apparatus as claimed in claim 1, wherein motion vectors estimated between a first and a second field are used to interpolate lines from a third field between lines from said second field (B) to obtain a progressively scanned field.

9. A receiver for television signals, comprising:
   means for receiving and decoding said television signals to obtain picture signals;
   means coupled to said receiving and decoding means for enhancing said picture signals; and
   characterized in that said enhancing means include a motion-compensated picture signal interpolation apparatus as defined in claim 1.

10. A motion-compensated picture signal interpolation apparatus as claimed in claim 6, wherein in the presence of fields originating from film pictures, motion vectors estimated between a first and a second film picture are used to interpolate a field between said first and second film pictures.

11. A motion-compensated picture signal interpolation apparatus comprising;
   memory means for furnishing a field sequence having a number of fields per second different from that of an input field sequence;
   motion vector estimation means coupled to said memory means for furnishing motion vectors;
   motion-compensated interpolation means coupled to said input and said output of said memory means for furnishing a sequence of motion-compensated output fields on the basis of said motion vectors; and
   wherein in the presence of fields originating from film pictures, said apparatus furnishes an output field sequence constituted by pairs of input fields alternated with pairs of interpolated fields.

12. A receiver for television signals, comprising:
   means for receiving and decoding said television signals to obtain picture signals;
   means coupled to said receiving and decoding means for enhancing said picture signals; and
   characterized in that said enhancing means include a motion-compensated picture signal interpolation apparatus as defined in claim 11.

* * * * *